(12) United States Patent
Nadeau et al.

(10) Patent No.: US 7,808,919 B2
(45) Date of Patent: Oct. 5, 2010

(54) NETWORK MONITORING USING A PROXY

(75) Inventors: Thomas David Nadeau, Hampton, NH (US); Mohammed Sayeed, Shrewsbury, MA (US); Sam Aldrin, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 198 days.

(21) Appl. No.: 12/077,487

(22) Filed: Mar. 18, 2008

(65) Prior Publication Data

US 2009/0238084 A1    Sep. 24, 2009

(51) Int. Cl.
*G06F 11/00* (2006.01)
(52) U.S. Cl. ...................................................... 370/248
(58) Field of Classification Search ......... 370/241–250, 370/351, 389, 395.1–397, 395.5–395.52, 370/401
See application file for complete search history.

(56) References Cited

U.S. PATENT DOCUMENTS

| | | | | |
|---|---|---|---|---|
| 6,965,572 | B1 * | 11/2005 | Boodaghians | 370/249 |
| 7,283,563 | B1 * | 10/2007 | Allan | 370/469 |
| 7,463,591 | B1 * | 12/2008 | Kompella et al. | 370/248 |
| 2005/0281192 | A1 | 12/2005 | Nadeau et al. | |
| 2006/0126495 | A1 | 6/2006 | Guichard et al. | |
| 2006/0198321 | A1 | 9/2006 | Nadeau et al. | |
| 2007/0025241 | A1 | 2/2007 | Nadeau et al. | |
| 2008/0037436 | A1 * | 2/2008 | Liu | 370/250 |
| 2008/0095061 | A1 * | 4/2008 | Hua et al. | 370/248 |
| 2008/0279110 | A1 * | 11/2008 | Hart et al. | 370/248 |

OTHER PUBLICATIONS

Cisco System, MPLS OAM Tools for Troubleshooting MPLS Networks, 44 pages, 2004.*
Xiao et al, Requirements for Pseudo-Wire Emulation Edge-to-Edge (PWE3), RFC 3916, 19 pages, Sep. 2004.*
Nadeau et al, Pseudowire Virtual Circuit Connectivity Verification (VCCV): A Control Channel for Pseudowires, RFC 5085, 30 pages, Dec. 2007.*
U.S. Appl. No. 11/135,253, filed May 23, 2005, Guichard et al.
U.S. Appl. No. 11/086,007, filed Mar. 22, 2005, Guichard et al.
U.S. Appl. No. 11/361,299, filed Feb. 24, 2006, Nadeau et al.
U.S. Appl. No. 11/328,436, filed Jan. 9, 2006, Aldrin et al.

(Continued)

*Primary Examiner*—Frank Duong
(74) *Attorney, Agent, or Firm*—Cindy Kaplan

(57) ABSTRACT

A method and apparatus for network monitoring using a proxy are disclosed. In one embodiment, a method generally comprises receiving at a proxy, path information for a label switched path (LSP) from a forwarding device located in the LSP, generating a connectivity verification message based on the path information, adding a proxy label to the connectivity verification message, and transmitting the connectivity verification message to the forwarding device. The proxy label is configured to inject the connectivity verification message into a forwarding plane at the forwarding device and the connectivity verification message is configured for transmittal from the forwarding device over the LSP to a destination node to verify a forwarding path associated with the path information received from the forwarding device.

20 Claims, 6 Drawing Sheets

OTHER PUBLICATIONS

U.S. Appl. No. 11/762,218, filed Jun. 13, 2007, Swallow et al.

Allan et al., "A Framework for Multi-Protocol Label Switching (MPLS) Operations and Management (OAM)", IETF RFC 4378, Feb. 2006.

Kompella et al., "Detecting Multi-Protocol Label Switched (MPLS) Data Plane Failures", IETF RFC 4379, Feb. 2006.

Bryant et al., "Pseudowire Emulation Edge-to-Edge (PWE3) Control Word for Use Over an MPLS PSN", IETF RFC 4385, Feb. 2006.

Srinivasan et al. Multiprotocol Label Switching (MPLS) Label Switching Router (LSR) Management Information Base (MIB), IETF RFC 3813, Jun. 2006.

* cited by examiner

NETWORK MONITORING USING A PROXY

BACKGROUND OF THE INVENTION

The present disclosure relates generally to network monitoring, and more specifically, to monitoring network paths using a proxy.

Computer networks provide an interconnection between different computers to allow exchange of data. A plurality of devices such as routers and switches interconnect user computers connected to the network. Network problems may arise which render devices or transmission paths between devices inoperable. For example, failures may occur at a port or forwarding engine of a forwarding device, or in a transmission line. A transmission line failure can typically be identified and bypassed by a routing protocol. However, identification of a forwarding problem may not be possible through use of the routing protocol. Continuity and consistency checks are therefore run to identify areas of potential problems. These checks involve sending a message to a remote node requesting an acknowledgement. If the acknowledgement is received, the remote node and intervening path is deemed operational.

Continuity and consistency checks require a number of tests to be run, which may result in a significant number of network monitoring packets being sent and received at any given time. Since the network monitoring traffic competes with the data traffic for system resources, the frequency of tests may be reduced if resources are limited. This may impact the SLA (Service Level Agreement) verification and monitoring and compromise service quality.

SUMMARY

A method and apparatus for network monitoring using a proxy are disclosed. In one embodiment, a method generally comprises receiving at a proxy, path information for a label switched path (LSP) from a forwarding device located in the LSP, generating a connectivity verification message based on the path information, adding a proxy label to the connectivity verification message, and transmitting the connectivity verification message to the forwarding device. The proxy label is configured to inject the connectivity verification message into a forwarding plane at the forwarding device and the connectivity verification message is configured for transmittal from the forwarding device over the LSP to a destination node to verify a forwarding path associated with the path information received from the forwarding device.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
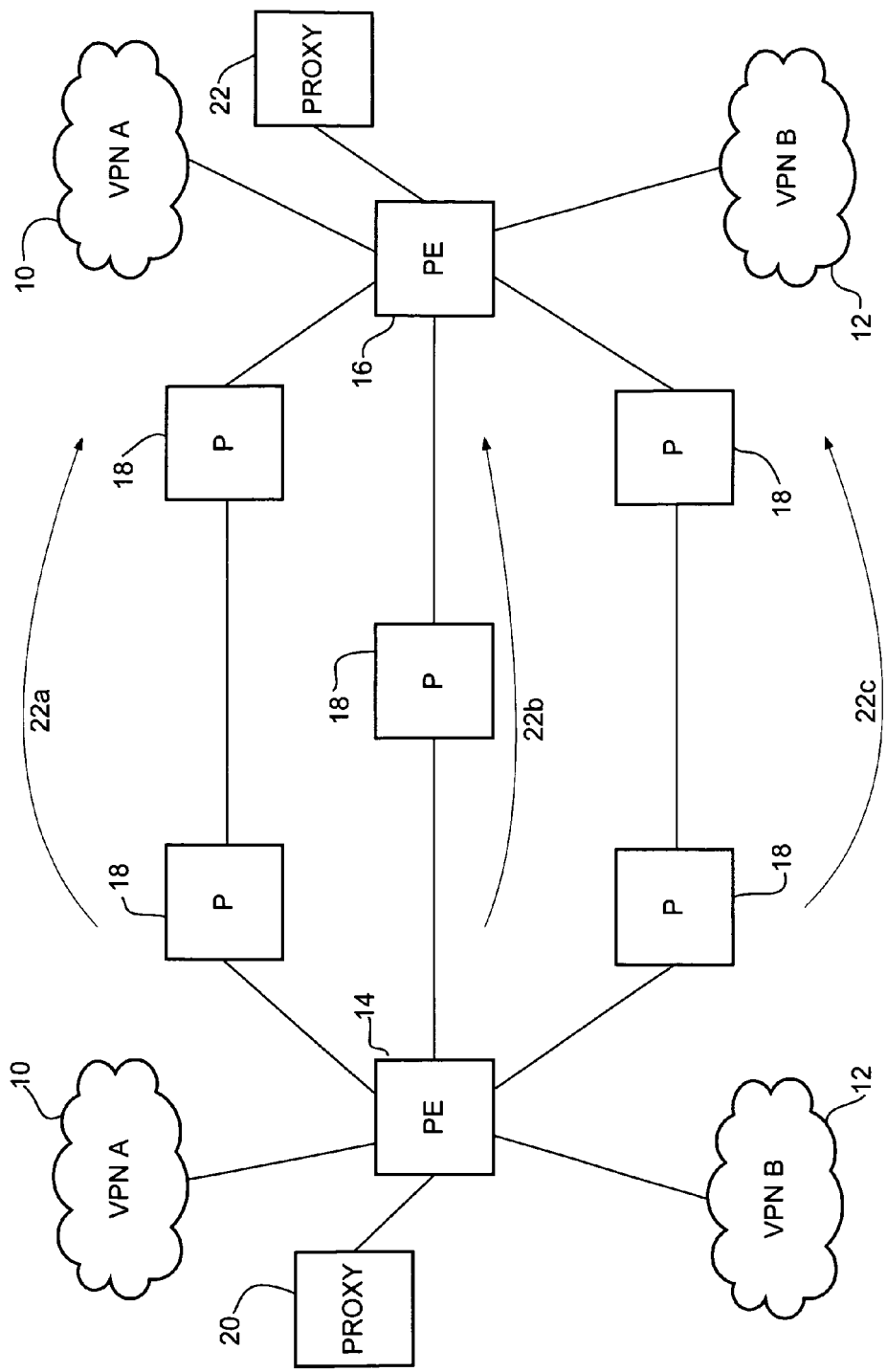
FIG. 1 illustrates an example of a network in which embodiments described herein may be implemented.

A method and apparatus for network monitoring using a proxy are disclosed. In one embodiment, a method generally comprises receiving at a proxy, path information for a label switched path (LSP) from a forwarding device located in the LSP, generating a connectivity verification message based on the path information, adding a proxy label to the connectivity verification message, and transmitting the connectivity verification message to the forwarding device. The proxy label is configured to inject the connectivity verification message into a forwarding plane at the forwarding device and the connectivity verification message is configured for transmittal from the forwarding device over the LSP to a destination node to verify a forwarding path associated with the path information received from the forwarding device.

Example Embodiments

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

A method and apparatus for monitoring a network utilizing a proxy are disclosed herein. The method and apparatus offload processing of network monitoring packets so that the processing does not impact data traffic processing, thereby increasing scalability and performance. The proxy may be used to monitor network performance including, for example, performance metrics associated with a Service Level Agreement (SLA) between a provider and a customer for a contract for service. As described in detail below, the proxy receives path information from a forwarding device and generates connectivity verification messages which are configured to emulate packets generated at the forwarding device for checking a network path. The proxy may also be used to intercept and process connectivity verification messages generated at a remote proxy.

Connectivity verification messages are transmitted to monitor the network and identify failures or possible problems within the network. The messages are sent periodically from an originating node to a destination node. These messages are also commonly referred to as continuity and consistency checks, OAM (Operations, Administration, Maintenance) messages, connectivity probes, connectivity pings, continuity checks, loopback test, or path consistency checks. Upon receiving the message, the destination node sends an explicit acknowledgement (response) message to the originating node. Upon receiving the acknowledgment message, the connectivity to the destination node is verified. If the originating node does not receive an acknowledgement from the receiving node, then the connectivity to the destination node is not verified.

It is to be understood that the phrase "connectivity verification" as used herein may refer to performing a continuity and consistency check, checking response time, detecting problems such as jitter, latency, packet delay and loss, identifying a failure, or any other monitoring of traffic on the network or performance of the network. The connectivity verification message may include sequencing information and time-stamps to provide performance metrics such as per direction jitter, per direction packet loss, one-way delay, round-trip delay, packet sequencing or corruption, for example.

Referring now to the drawings, and first to FIG. 1, an example of a network that may implement embodiments described herein is shown. The embodiments operate in the context of a data communication network including multiple network elements. Some of the nodes in a network that employs the embodiments may be network devices such as routers, switches, gateways, or user devices. The network device may include, for example, a master central processing unit (CPU), interfaces, and a bus. The CPU preferably includes memory and a processor. The network device may be implemented on a general purpose network host machine such as a computer system or network device described below with respect to FIG. 6.

FIG. 1 illustrates a core network, or service provider network, and a plurality of customer networks connected via the core network. The customer networks may be, for example, VPNs (VPN A 10, VPN B 12 shown in FIG. 1), LANs, intranets or other interconnection operable for providing services from the core network. The customer networks connect to a plurality of end user devices, such as desktops, laptops, cell phones, or personal communication devices (not shown). In a typical customer network, each subnetwork has one or more gateway nodes or customer edge (CE) routers, through which traffic egressing and ingressing to and from other subnetworks passes. The customer networks connect to the core network via a forwarding device referred to as a provider edge (PE) router (PE nodes 14, 16). The core network further includes a plurality of interconnected forwarding devices (provider (P) nodes) 18, such as routers, bridges, gateways, and other connectivity devices operable for transport and switching message traffic. In the example shown in FIG. 1, the core network includes three paths 22a, 22b, 22c from PE 14 to PE 16.

In one embodiment, network nodes 14, 16, 18 are routers that implement Multi-Protocol Label Switching (MPLS) and operate as Label Switched Routers (LSRs). Label Distribution Protocol (LDP) can be used to establish Label Switched Paths (LSPs), which are a sequence of labels at every node along the path from the source to the destination. Each LSP is identified by an MPLS Forwarding Equivalence Class (FEC). An FEC represents a group of flows with the same traffic engineering requirements. A specific label may be bound to an FEC. Each data packet encapsulates and carries the labels as they travel from source to destination. Upon entry to the MPLS network, an MPLS header is inserted at the front of each packet. The MPLS header contains a stack of labels that uniquely identify the switching path between any two LSRs. As each packet is received by a node, it may push a new label onto the stack of a packet before forwarding it on, pop a label from the stack, or swap one or more of the labels with new labels.

In the network shown in FIG. 1, a proxy 20 is associated with provider edge device 14 and proxy 22 is associated with provider edge device 16. Each proxy 20, 22 allows for the running of connectivity verification without impacting performance at the provider edge device 14, 16. This allows an operator to run connectivity checks at a faster rate and at a much greater scale than if the checks were generated and processed at the provider edge device.

The proxies 20, 22 shown in FIG. 1 are illustrated as devices located external to the PE devices 14, 16, however, it is to be understood that the proxy 20, 22 may also be integral with the edge device. For example, the proxy may be run on a dedicated management CPU/processor, line card's CPU, TCAM or packet processor with the forwarding device (e.g., PE router). The proxy may also operate from an offline device. Only a single connection is required (logical or physical) between the provider edge device 14, 16 and the proxy 20, 22 to deliver connectivity verification packets to the PE device. The proxy 20, 22 may be run on any type of computerized system such as a router, IP-SLA shadow router, management station, personal computer, workstation, portable computing device, mainframe, server, or the like. The proxy 20, 22 is configured to allow direct injection of any type of packet into a forwarding plane (including an MPLS forwarding plane), based on a control plane exchange between the proxy and edge device 14, 16 (described below).

FIG. 1 illustrates the proxy 20, 22 located at a forwarding device 14, 16 at one end of a path within the core network. The proxy may also be located at other points within the network topology and operable to inject packets that can merge with an existing LSP so that it can test a portion of the LSP between the proxy and another proxy (or other destination node); Also, any number of proxies may be used to monitor a network, including only one proxy or two or more proxies, based on the number of paths, frequency of connectivity verification checks, amount of processing required, and resources available. Furthermore, the provider edge device 14, 16 shown in the network of FIG. 1, is only one example of a forwarding device. The proxy may be used to offload OAM processing from other types of forwarding devices. Thus, it is to be understood that the network and proxy arrangement shown in FIG. 1 is only one example and that the proxy may be implemented on various networks and network devices without departing from the scope of the invention.

As described in detail below, the proxy is configured to inject connectivity verification packets to a target device forwarding plane. The packets pass through the connectivity verification stream as if they were generated directly by the target device. In addition to generating and injecting connectivity verification messages into a forwarding plane, the proxy may also operate to intercept and process packets that are destined to a forwarding device associated with the proxy. For example, proxy 22 may process connectivity verification packets destined for PE device 16 and generate a reply which is injected back into the forwarding plane at PE device 16. Use of the proxy 20, 22 thus allows verification of the PE data paths from an ingress interface to backplane, and to an egress interface, and therefore simulates more closely the data packet processing/switching behavior across the forwarding device's backplane. In contrast, connectivity verification packets that are generated natively on the forwarding device's CPU or route processor are injected artificially into an outgoing line card or port and do not check the complete path from ingress to egress. The proxy also allows for the connectivity verification traffic to test each of the VRF (Virtual Routing and Forwarding) LSPs without requiring the proxy interface to be part of the VRF under test.

Figure 2:
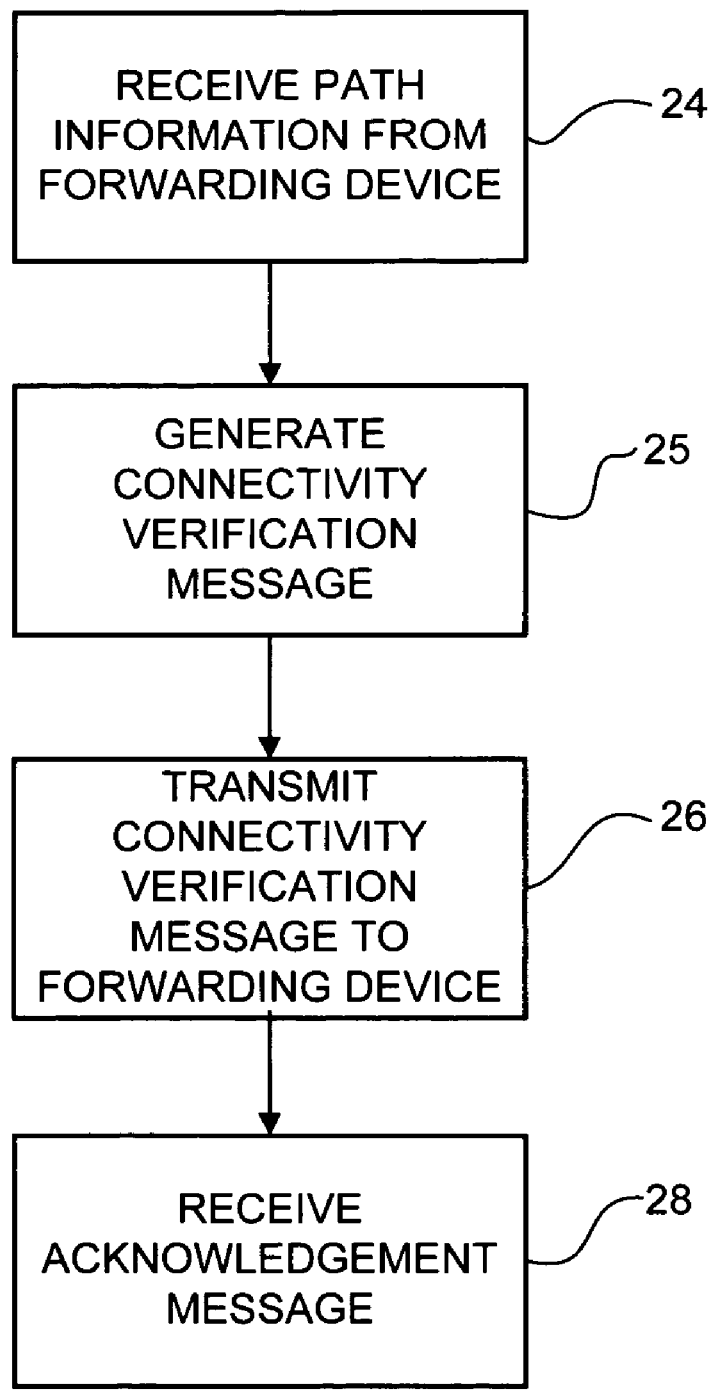
FIG. 2 is a flowchart illustrating an overview of a network monitoring process utilizing a proxy, in accordance with one embodiment.
Figure 3:
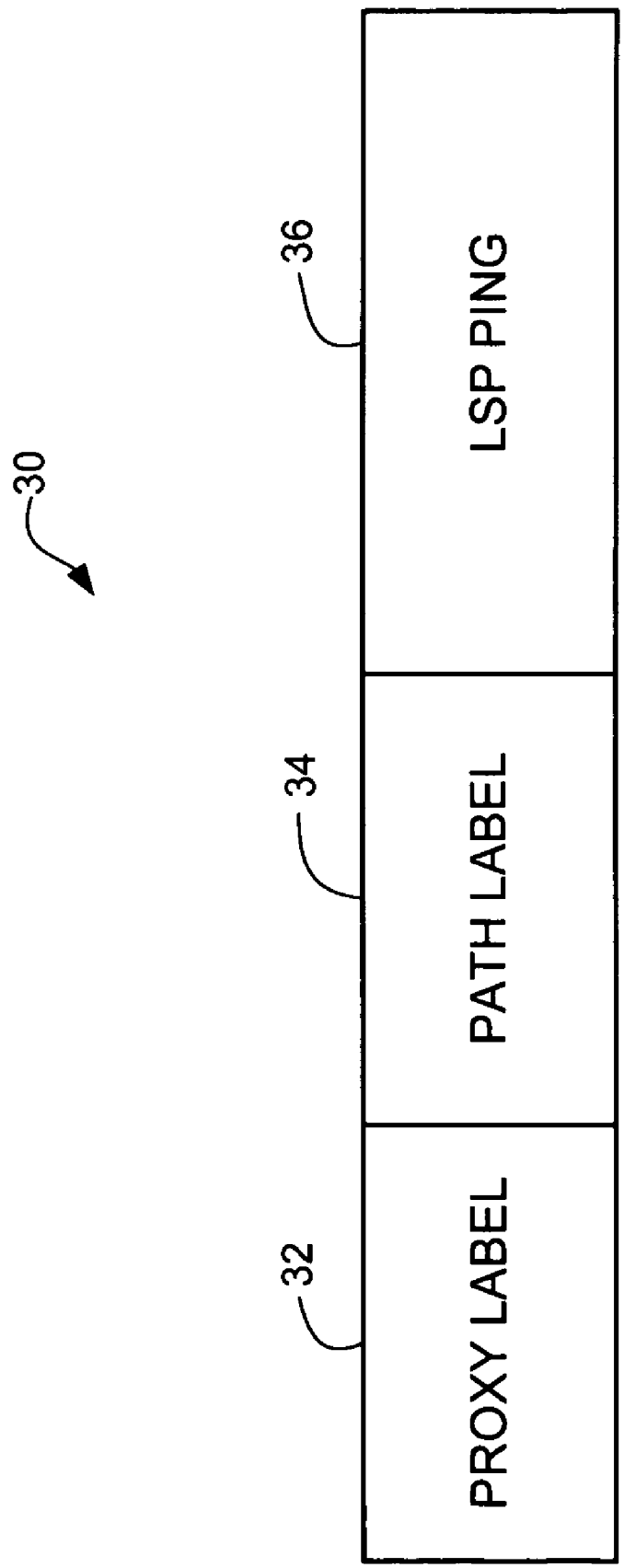
FIG. 3 illustrates an example of a format of a packet transmitted from the proxy to perform a check of a network path.

FIG. 2 is a flowchart illustrating an overview of a process for monitoring a network utilizing the proxy, according to one embodiment. At step 24, the proxy 20 receives path information from the forwarding device 14 (FIGS. 1 and 2). As described below, the forwarding device is configured to send path information to the proxy using, for example, NetFlow or other mechanism. The path information may comprise MPLS FEC information, for example. The proxy 20 then generates a connectivity verification message (step 25). The connectivity verification message may be an LSP ping encapsulated as shown in FIG. 3 and described below, for example. The proxy 20 identifies a remote destination node from which an acknowledgement reply to the message is requested. In the example shown in FIG. 1, the destination node may be PE node 16 or proxy 22. The proxy 20 also identifies the proxy address (originating node) in the connectivity verification message. At step 26, the connectivity verification message is transmitted from the proxy 20 to the edge device 14. Upon receiving the connectivity verification message from the proxy 20, the PE device 14 transmits the connectivity verification message onto the path as if it were originating the message. The connectivity verification message is used to verify a forwarding path associated with the path information received from the forwarding device. The destination node receives the connectivity verification message and sends an acknowledgement message back over the same set of hops defining the path to the originating node. The proxy 20 receives the acknowledgement at step 28. The proxy may generate performance information based on received packets or may store information contained in the packets for processing at another device. If the acknowledgement message fails to reach the originating node, then the remote "pinged" node is deemed unavailable.

FIG. 3 illustrates an example of a packet 30 generated at the proxy 20 and transmitted to the forwarding device 14. In one embodiment, the proxy 20 encapsulates an LSP ping 36 with a path label 34 specifying a path (e.g., path 22a for VPN A) and a proxy label 32 specifying the provider edge 14 that will receive the packet (FIGS. 1 and 3). The LSP ping 36 identifies a complete path defined by a set of hops, therefore enabling a ping and ping reply between nodes and across a path. The LSP ping preferably specifies the proxy 20 as the originating device so that it receives the acknowledgement packet. The destination device may be the provider edge device 16 or proxy 22. It is to be understood that the format shown in FIG. 3 is only one example and that other packet fields, labels, or formats may be used without departing from the scope of the invention.

The proxy described above may be used in a number of different applications, including, for example, L2VPN (pseudowire/VCCV (Virtual Circuit Connectivity Verification)), L3VPN, Traffic Engineering, Virtual Private LAN Service (VPLS), or Connectivity Fault Management (CFM) (described in IEEE P802.1ag/D8.1, June 2007, "Standard for Local and Metropolitan Area Networks—Virtual Bridged Local Area Networks—Amendment 5: Connectivity Fault Management"). It is to be understood that the applications described herein are only provided as examples and that the proxy may also be used in other applications.

Figure 4:
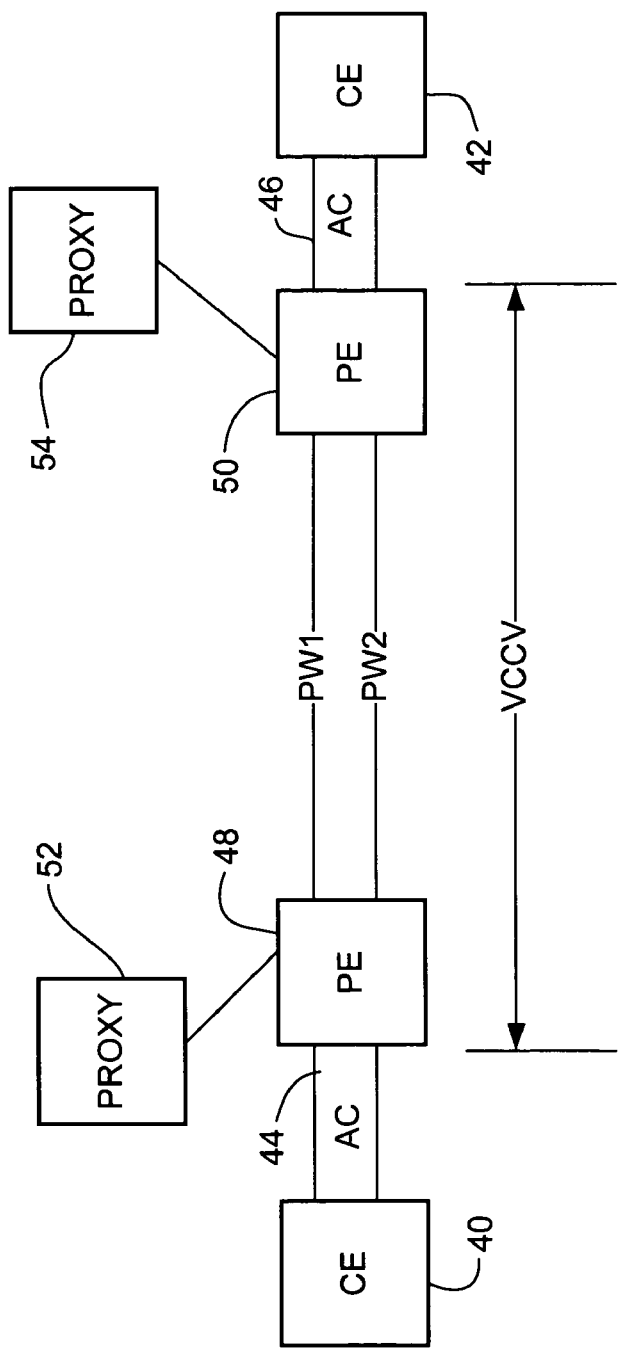
FIG. 4 illustrates an example of the proxy in a network using pseudowire virtual circuit connectivity verification.

FIG. 4 illustrates an example of the proxy implemented for connectivity checks in a network utilizing pseudowire. Communication is provided by tunnels commonly referred to as pseudowire. Pseudowires extend connectivity across multiple routers via label switched paths and provide a virtual connection between edge routers defining the edge of the core network. A plurality of pseudowires may be established between the edge routers, therefore providing an infrastructure for efficient traversal of the core network by message traffic. In the network shown in FIG. 2, two pseudowires PW1 and PW2 extend between two PE nodes 48, 50. Each of the pseudowires PW1, PW2 represents a logical connection spanning multiple node hops that is selectable from a routing decision at a source PE to a destination PE, which determines the path through the intermediate node hops, such as via label switched paths or other transport mechanism. The PE devices 48, 50 provide pseudowire emulation, enabling customer edge (CE) devices 40, 42 to communicate over the network.

In the example shown in FIG. 4, customer edge routers 40, 42 are attached via Attachment Circuits (ACs) 44, 46 at provider edge routers, 48, 50 respectively. The ACs 44, 46 denote pseudowire ACs such as Ethernet pseudowires, but may be used in other types of pseudowire. The AC may be, for example, a Frame Relay Data Link Connection (DLCI), ATM Virtual Path Identifier/Virtual Channel Identifier (VPI/VCI), an Ethernet port, etc. Proxies 52, 54 are connected to (or located at) provider edge devices 48, 50, respectively. The proxy 52, 54 may be attached to the provider edge device 48, 50 via a single interface (e.g., Ethernet interface) or may be integral with the PE device, as previously discussed. The proxy 52, 54 provides the capability to monitor various operational parameters such as the status of pseudowires within a tunnel and provide support functions such as OAM message mapping for native attachment circuits.

In a VPN environment employing pseudowires, VCCV (Virtual Circuit Connectivity Verification) is a protocol which is employed for checking the connectivity status of a given pseudowire, operating in-band with the pseudowire data. VCCV is used to "ping" a given pseudowire, reporting data plane connectivity status for the pseudowire. VCCV provides a control channel that is associated with a pseudowire (PW1, PW2), as well as the corresponding operations and management functions (such as connectivity verification) to be used over that control channel. VCCV thus provides several means of creating a control channel over the pseudowire, between the PE routers that attach the pseudowire.

Figure 5:
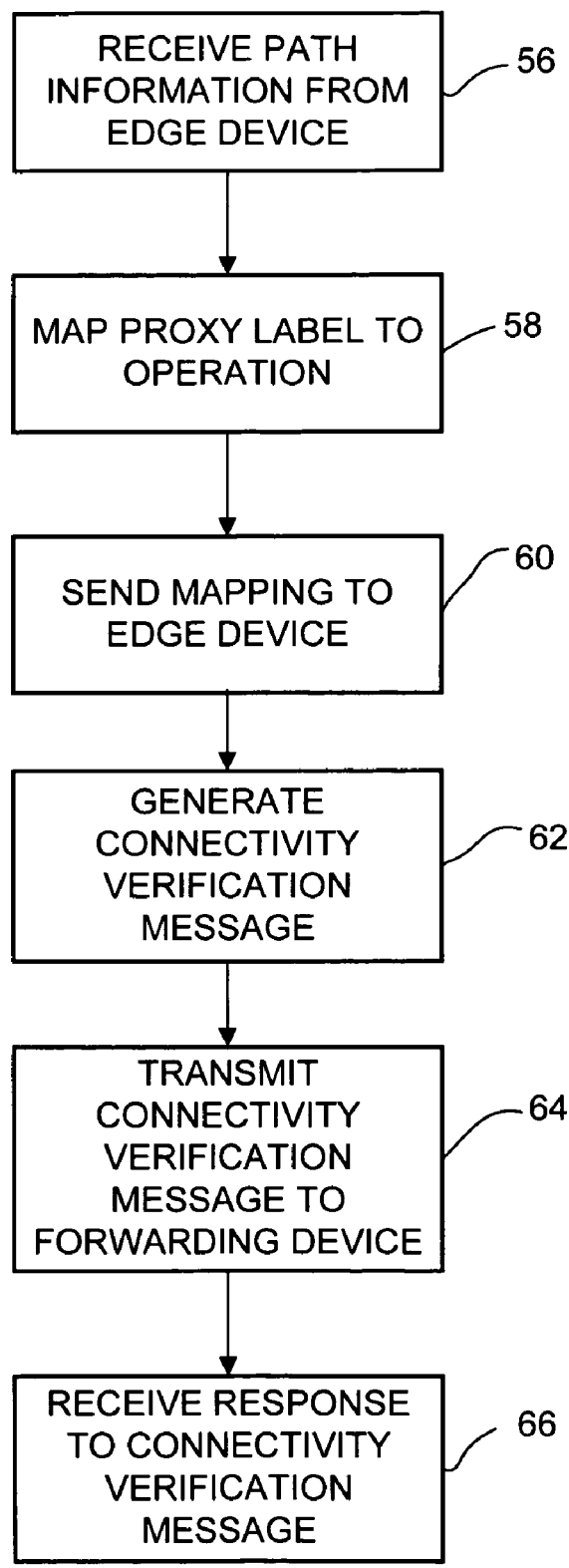
FIG. 5 is a flowchart illustrating a network monitoring process for the network of FIG. 4.

FIG. 5 is a flowchart illustrating an example of a process for utilizing the proxy to monitor a network comprising pseudowires, such as shown in FIG. 4. At step 56 the proxy 52 receives path information from the provider edge device 48 (FIGS. 4 and 5). In one embodiment, NetFlow/PAL (Prefix/Application Label) is used to obtain path information from the edge device. NetFlow allows a LSR to collect and export MPLS labels allocated by the LSR when an adjacent router pushes that label on top of the label stack of a transit packet. The LSR collects the prefix associated with the MPLS label and the application that allocated the label. The router collects the information in a table called an MPLS PAL table and exports this data to a NetFlow collector as the label is allocated or, if so configured, periodically exports the full MPLS PAL table. NetFlow/PAL may be enabled on the provider edge device 48 with the proxy 52 identified as a NetFlow collector, for example. The PE device 48 is configured to advertise control plane information for the label mappings used in pseudowire (or other application in use) to the proxy 52 using NetFlow/PAL. NetFlow data plane records are preferably filtered so that they are not sent to the proxy 52, as they are not needed. It is to be understood that NetFlow is only one example for obtaining path information from the edge device 48, and that other methods may be used to obtain the path information.

For each pseudowire label mapping, the proxy chooses a proxy label and maps it to an operation (e.g., POP and Forward, Switch, Special Handling on PE) (step 58). The label mapping may be selected based on the type of hardware or application. For example, for Layer 2 VPN (L2VPN) applications, POP and Forward or Special Handling is used. Since no labels for L2VPN FEC types are distributed to the proxy, no Switch options are available.

A signaling protocol or static programming may be used to send the mapping to the PE device 48 (step 60). If static programming of labels is used, the proxy 52 logs into the provider edge device 48 and sends CLI (Command Line Interface) commands directly. The proxy may also send SNMP (Simple Network Management Protocol) MIB (Management Information Base) information according to RFC 3813 (C. Srinivasan et al., "Multiprotocol Label Switching (MPLS) Label Switching Router (LSR) Management Information Base", June 2004), for example. If a signaling protocol is used, the proxy 52 sends the mapping to the PE device 48 via an IGP (Interior Gateway Protocol) such as LDP (Label Distribution Protocol).

Once the label mapping is received at the provider edge device 48, the PE programs each label entry into its forwarding database. If a distributed hardware architecture is utilized, the hardware-forwarding path is then programmed.

At step 62, the proxy 52 generates connectivity verification packets for each pseudowire. The proxy 52 uses the information it received from the PE device 48 to construct the packet as if it were the provider edge. The proxy 52 then appends the proxy label to the label stack. When constructing a pseudowire/VCCV packet, the proxy preferably constructs the packet using a PWE3 (Pseudowire Edge-to-Edge Emulation) control word and new OAM control channel type in the control word (described below). This allows the destination (far end) PE 50 to process or punt the packet to the attached proxy 54 as configured.

At step 64, the proxy 52 transmits the connectivity verification packet to the PE device 48. When the packet arrives at the provider edge device 48, the PE forwards the packet per data plane forwarding (as previously programmed) towards provider edge 50. The PE 48 removes the proxy label from the front of the packet and forwards the packet towards its destination (e.g., PE node 50) as if the packet were generated at the PE 48.

When the packet arrives at remote provider edge device 50, the PE performs a lookup for the control word and identifies the control channel type. The PE 50 decides (via configuration) whether or not to process the packet locally or forward the packet on to the proxy 54. If the new control channel type is present and forwarding is configured, all packets arriving at the provider edge device 50 are forwarded directly to the proxy 54 for offline processing. The PE device 50 forwards the packet to proxy 54 on the configured interface by inserting an IP header with a destination address of the proxy and delivers it directly to the proxy. If the channel type is not understood in hardware, then the packet is sent to the route processor and the route processor performs the processing described above. The proxy 54 then processes the packet and responds as per the request and configured options. If the provider edge device 50 is not configured to forward the packet to the proxy 54, the PE processes the packet and responds with an acknowledgement (connectivity verification response) packet.

At step 66, the proxy 52 receives the response packet and collects the information to generate performance metrics, or collects the data and forwards the information to another device which generates performance metrics.

As noted above, in one embodiment a new channel type is defined for use with the proxy. The pseudowire associated channel types used by VCCV rely on previously allocated numbers from a pseudowire associated channel types registry (RFC 4385, "Pseudowire Emulation Edge-to-Edge (PWE3) Control Word for Use over an MPLS PSN", S. Bryant et al., February 2006). In particular, 0x21 (Internet Protocol version 4 (IPv4)) is used whenever an IPv4 payload flows the pseudowire associated channel header or 0x57 is used when an IPv6 payload flows the pseudowire associated channel header. In cases, where a proxied VCCV flow is sent, a new associated channel type may be defined as follows:

| Value (in hex) | Protocol Name | Reference |
|---|---|---|
| PW-ACT-TB | BFD Without IP/UDP Header | VCCV |

The following describes modification of the above-described process for use with applications other than pseudowire.

Another application in which the proxy may be used is Layer 3 VPN (L3VPN). In one embodiment, the NetFlow/PAL record is exported to the proxy from the forwarding device, as previously described. The proxy encapsulates the packet containing a label stack for VPN FEC with the proxy label. Upon receiving the connectivity verification packet at the forwarding device, the outer label (proxy label) is removed and the packet is forwarded to the destination node (e.g., remote PE device). The packet is received at the destination node and is sent to the route processor for processing. A configuration option is preferably provided on the destination node, so that a proxy can be configured to receive and process the OAM traffic from the destination node. This may be set as a CLI option, for example. If the proxy associated with the remote node is configured to receive the connectivity verification packet, the packet is forwarded to the proxy before it is sent through the OAM process on the route processor. The response from the proxy (or remote edge device) is sent back to the forwarding device according to the return path configuration. The forwarding device then forwards the response packet to the proxy originating the connectivity verification message for processing.

The following describes merge to an LSP for cases where an LDP session is available. The labels may be advertised to the proxy as normal peers and no de-aggregation (de-agg) is needed. Alternatively, only a de-aggregation label may be advertised to minimize the label bindings advertised to the proxy. Extending LDP to advertise de-aggregation for the proxy is used in this case. The Label Merge capability of MPLS allows packets to traverse the correct LSPs towards destination node (e.g., provider edge or proxy).

In the case where an LDP session is not available between the forwarding device and proxy, the following process is performed. The interface between the proxy and forwarding device is enabled for MPLS with static label bindings and only accepts a de-agg labeled packet. The proxy is configured for imposition of de-agg label. Packets sent from the proxy appear at the forwarding device with the de-agg label. The forwarding device removes the de-agg label and forwards the packets onto the interface/LSP with the correct bindings. As in the case of L3VPN, the packets received on the remote node may be forwarded onto the proxy associated with the remote node for processing, as per the configuration of the proxy at the remote node. The response packet is sent back to the forwarding device, which in turn forwards the packet to the proxy originating the connectivity verification message.

As previously noted, the proxy may also be used in Traffic Engineering (TE). In this case, the connectivity verification packets generated at the proxy are pushed onto a TE tunnel. The packets arriving at the forwarding device may be IP or label switched packets. Since in MPLS TE the preferred path is the TE tunnel, the traffic gets mapped to the tunnel responsible for advertising the prefixes. The network monitoring packets can check the liveliness of the tunnels.

When using the proxy with Fast Reroute (FRR), the process depends on whether the provider edge or one of the provider nodes is the PLR (Point of Local Repair). If the PE is the PLR, the FRR process is independently executed and has no bearing on the network monitoring process. The label bindings are exported to the proxy similar to the other cases (via a control protocol). The proxy generates network monitoring packets and sends them to the PE. The PE forwards the packets into the tunnels (primary or backup). If one of the provider nodes is the PLR, the proxy does not need to know about the state of the TE tunnel. Therefore, no TE state information needs to be sent over the control protocol unless the TE tunnel is in down state and the labels are withdrawn.

Use of the proxy with Virtual Private LAN Service (VPLS) is similar to L2VPN behavior for checking pseudowires. However, additional checks may be incorporated to test the bridge domain itself. For example, a heartbeat type mechanism generated at the proxy can be sent with broadcast attribute to all members of the VPLS domain. This can be used to check the VPLS VSI (VPLS Service Instance).

Figure 6:
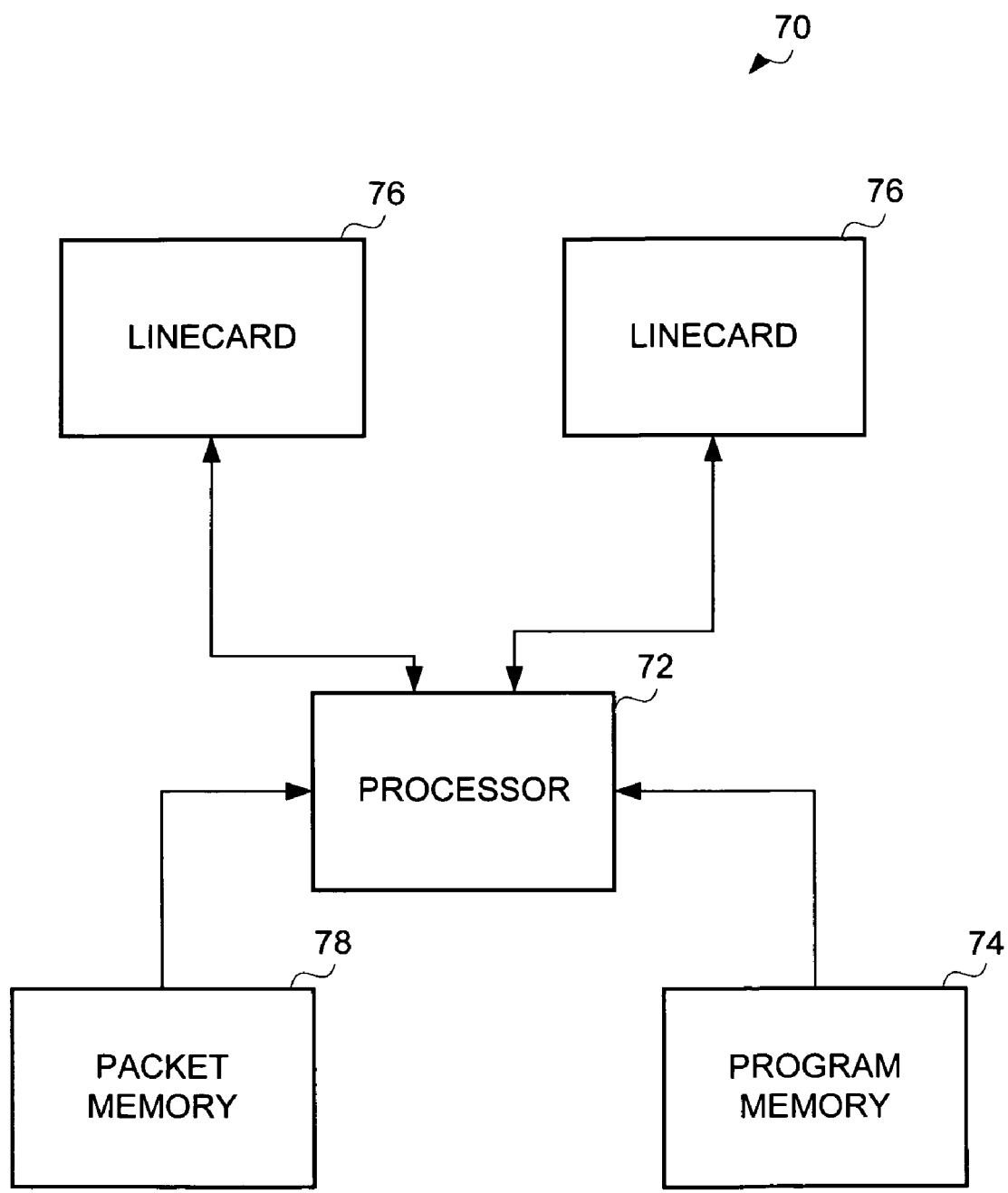
FIG. 6 depicts an example of a network device useful in implementing embodiments described herein.

FIG. 6 depicts a network device 70 that may be used to implement embodiments described herein. Network device 70 is configured to implement all of the network protocols and extensions thereof described above. In one embodiment, network device 70 is a programmable machine that may be implemented in hardware, software, or any combination thereof. A processor 72 executes codes stored in a program memory 74. For example, embodiments disclosed herein may be encoded as logic in one or more tangible media for execution and, when executed, operable to perform the encoded embodiments. The processor includes means for receiving path information, means for generating a connectivity verification message, means for adding a proxy label, means for transmitting the connectivity verification message, and means for selecting an operation. Program memory 74 is one example of a computer-readable medium. Program memory 74 can be a volatile memory. Another form of computer-readable medium storing the same codes is a type of non-volatile storage such as floppy disks, CD-ROMs, DVD-ROMs, hard disks, flash memory, etc.

Network device 70 interfaces with physical media via a plurality of linecards 76. Linecards 76 may incorporate Ethernet interfaces, DSL interfaces, Gigabit Ethernet interfaces, 10-Gigabit Ethernet interfaces, SONET interfaces, etc. As packets are received, processed, and forwarded by network device 70, they may be stored in a packet memory 78. To implement functionality according to the system, linecards 76 may incorporate processing and memory resources similar to those discussed above in connection with the network device as a whole. It is to be understood that the network device 70 shown in FIG. 6 and described above is only one example and that different configurations of network devices may be used.

As can be observed from the foregoing, the proxy described herein provides numerous advantages. For example, the proxy provides an operator with increased flexibility in how to deploy OAM checks in the network for improved measurements and traffic SLAs. The proxy also offloads processing from edge devices to the proxy, to free up more resources for forwarding network traffic. Furthermore, the proxy allows for greater scaling opportunities since modification of the proxy would not disrupt the existing device for which it is providing proxy capabilities.

Although the method and system have been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method comprising:
   receiving at a proxy, path information for a label switched path (LSP) from a forwarding device located in said LSP, the proxy and the forwarding device utilizing separate processors;
   generating at the proxy, a connectivity verification message based on said path information;
   adding a proxy label to said connectivity verification message at the proxy, said proxy label configured to inject said connectivity verification message into a forwarding plane at the forwarding device; and
   transmitting said connectivity verification message from the proxy to the forwarding device;
   wherein said connectivity verification message is configured for transmittal from the forwarding device over said LSP to a destination node to verify a forwarding path associated with the path information received from the forwarding device.

2. The method of claim 1 wherein receiving path information comprises receiving NetFlow packet data.

3. The method of claim 1 further comprising:
   selecting an operation for said forwarding device;
   mapping said operation to said proxy label; and
   transmitting said mapping to the forwarding device.

4. The method of claim 3 wherein said operation comprises removing said proxy label and forwarding said connectivity verification message.

5. The method of claim 1 wherein said path comprises a pseudowire traversing a core network.

6. The method of claim 5 wherein said proxy label comprises a Virtual Circuit Connectivity Verification (VCCV) channel type configured for use by a remote forwarding device in the core network.

7. The method of claim 1 wherein said LSP comprises a Multi-Protocol Label Switching (MPLS) Traffic Engineering LSP.

8. The method of claim 1 wherein said connectivity verification message comprises an LSP ping.

9. The method of claim 1 wherein the forwarding device is a provider edge router in a Multi-Protocol Label Switching (MPLS) network.

10. The method of claim 1 further comprising receiving at the proxy, a response to said connectivity verification message, said response comprising a packet generated at a remote proxy.

11. The method of claim 1 further comprising receiving a second connectivity verification message from the forwarding device,
   generating a response to said second connectivity verification message, and
   transmitting said response to the forwarding device for forwarding on said LSP.

12. An apparatus comprising:
   a processor configured for receiving path information for a label switched path (LSP) from a forwarding device located in said LSP, generating a connectivity verification message based on said path information, adding a proxy label to said connectivity verification message, said proxy label configured to inject said connectivity verification message into a forwarding plane at the forwarding device, and transmitting said connectivity verification message to the forwarding device, the processor separate from a processor used by the forwarding device; and memory for storing said path information;

wherein said connectivity verification message is configured for transmittal from the forwarding device over said LSP to a destination node to verify a forwarding path associated with the path information received from the forwarding device.

13. The apparatus of claim 12 wherein the processor is further configured to select an operation for said forwarding device, map said operation to said proxy label, and transmit said mapping to the forwarding device.

14. The apparatus of claim 12 wherein said proxy label comprises a Virtual Circuit Connectivity Verification (VCCV) channel type configured for use by a remote forwarding device.

15. The apparatus of claim 12 the forwarding device is a provider edge router in a Multi-Protocol Label Switching (MPLS) network.

16. The apparatus of claim 12 wherein the processor is further configured for receiving a response to said connectivity verification message, said response comprising a packet generated at a remote proxy.

17. An apparatus comprising:

means for receiving at a proxy, path information for a label switched path (LSP) from a forwarding device located in said LSP, the proxy and the forwarding device configured for utilizing separate processors;

means for generating at the proxy, a connectivity verification message based on said path information;

means for adding at the proxy, a proxy label to said connectivity verification message, said proxy label configured to inject said connectivity verification message into a forwarding plane at the forwarding device; and means for transmitting said connectivity verification message from the proxy to the forwarding device;

wherein said connectivity verification message is configured for transmittal from the forwarding device over said LSP to a destination node to verify a forwarding path associated with the path information received from the forwarding device.

18. The apparatus of claim 17 further comprising means for selecting an operation for said forwarding device, mapping said operation to said proxy label, and transmitting said mapping to the forwarding device.

19. The apparatus of claim 17 wherein said proxy label comprises a Virtual Circuit Connectivity Verification (VCCV) channel type configured for use by a remote forwarding device.

20. The apparatus of claim 17 further comprising means for receiving a response to said connectivity verification message, said response comprising a packet generated at a remote proxy.

* * * * *